Nov. 29, 1927.

E. S. EVANS 1,651,260

CHOCK BLOCK

Filed April 11, 1927

INVENTOR.
E. S. Evans.
BY
F. K. Bryant
ATTORNEY

Patented Nov. 29, 1927.

1,651,260

UNITED STATES PATENT OFFICE.

EDWARD S. EVANS, OF DETROIT, MICHIGAN, ASSIGNOR TO THE EVANS AUTO LOADING CO. INC., OF DETROIT, MICHIGAN, A CORPORATION OF DELAWARE.

CHOCK BLOCK.

Application filed April 11, 1927. Serial No. 182,800.

This invention relates to an improvement in chock blocks for chocking vehicle wheels, especially in the shipping of automobiles.

It is the general practice to block automobile wheels while in transit by means of wooden, metal or composition chock blocks having a curved face to fit against the tire. In the use of these chock blocks it has been found that an objectionable marring and staining of the tire has resulted from several causes. In the case of composition blocks, the staining has been produced by the gummy or similar material in the composition from which the block is formed, a characteristic of asphalt which is commonly used in such cases. In the case of metal chock blocks, staining has often been caused by rust on the curved tire bearing surface, while in the instance of wooden blocks, the staining has been caused by the adherence of dirt and the exudation of gummy or resinous material therefrom. Moreover, in all three types of chock blocks the bearing surface is characterized by an objectionable roughness which causes considerable chafing, and when this chafed portion of the tire surface is stained as referred to, it becomes an extremely difficult matter to remove the stain.

The object of the present invention is to provide the curved tire bearing face or surface of a chock block with a smooth clean stain-preventing covering composed of suitably finely divided material such as sawdust, sand, straw or the like.

A more specific object is to provide a stain-preventing covering of the above kind which, in the case of composition chock blocks, may be readily applied during the manufacture of the block by placing the finely divided material in a mold section or a section of the mold in which the block is formed, the finely divided material being embedded in the curved bearing surface by pressure during the molding operation so as to form a composite part of the finished chock block.

Other objects will become apparent as the nature of the invention is better understood, and the same consists in the novel form, combination and arrangement of parts hereinafter more fully described, shown in the accompanying drawing and claimed.

Figure 1:
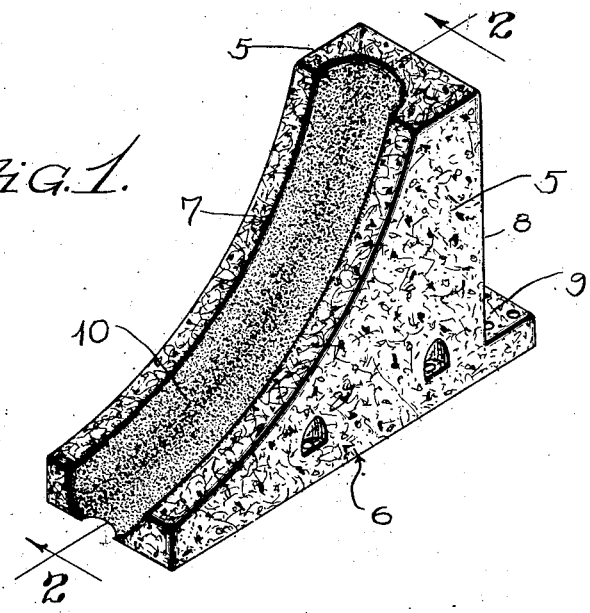
Figure 2:
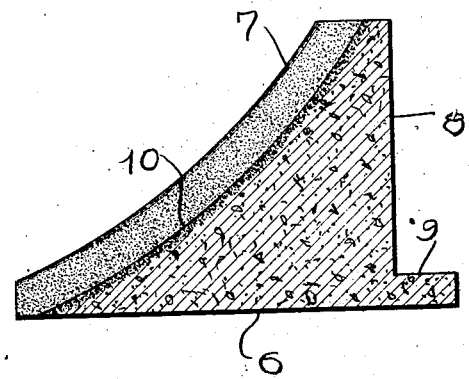
Figure 3:
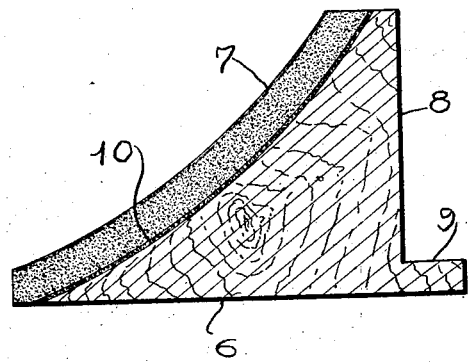

In the drawing, wherein like reference characters indicate corresponding parts throughout the several views, Figure 1 is a perspective view of a composition chock block provided with a stain-preventing covering on its curved tire bearing surface, in accordance with the present invention;

Figure 2 is a central longitudinal sectional view taken substantially upon line 2—2 of Figure 1; and Figure 3 is a view similar to Figure 2 of a wooden chock block provided with a bearing surface covering in accordance with the present invention.

Referring more in detail to the drawing, the form of chock block shown in Figures 1 and 2 is preferably formed from plastic material highly compressed as disclosed in my co-pending application upon chock block, Serial No. 182,799, filed April 11, 1927. However, it is obvious that the block of Figures 1 and 2 may be molded of any suitable material while in a plastic state, so long as the material has the property of hardening to a condition of strength suitable for the purpose, after being molded.

In each case, the block preferably comprises vertical sides 5, a base 6 and a curved front bearing face or surface 7 which is preferably grooved lengthwise as shown so as to conform substantially to the transverse curvature of the tire of the wheel which is to be chocked by the block. In the case of composition or wooden blocks, the latter will be of solid formation as shown, and a heel extension is preferably provided at the lower portion of the rear vertical face 8, as at 9, to facilitate attaching the block to the car floor.

In accordance with the present invention, the curved tire bearing surface 7 is provided with a smooth stain preventing covering of clean finely divided material as at 10, sawdust, sand or straw being suitable for the purpose. By providing a covering 10 in this way, the objectionable chafing will be prevented to a great extent, and the more objectionable staining will be entirely obviated. In the manufacture of the composition block, the layer of finely divided covering-forming material is preferably placed in a member of the mold, and during the molding operation, pressure is preferably applied so that the covering layer 10 of finely divided material is pressed or embedded in the bearing surface 7 to form a composite part of the block. In the case of wooden or metal chock blocks, the covering 10 of finely divided material is preferably applied by pressure so as to be of uniform thickness, and suitable adhesive material may be employed to insure uniting of the covering to the bearing surface. Naturally, due to the yielding nature of wood, the finely divided material, when consisting of sand or the like will be embedded to a slight extent in the bearing surface so that the covering 10 will not become readily destroyed or partly removed by abrasion when in use.

Chock blocks provided with a stain-preventing covering in accordance with the above will enable shipment of the automobiles to the dealers with the tires in clean and otherwise presentable condition or appearance, thus removing considerable cause for worry on the part of the dealer.

It is of course well known that strips of fabric or felt have heretofore been employed in a somewhat similar relation, solely for the purpose of preventing chafing; the covering being applied by nailing, riveting or the like. However, the present invention is different in that it provides a composite element of a chock block primarily designed and adapted for preventing staining of the tire.

Minor changes may be made without departing from the spirit and scope of the invention as claimed.

What I claim as new is:—

1. A chock block having a curved bearing face provided with a covering of finely divided material.

2. In combination, a chock block having a curved bearing face, and a smooth covering of finely divided material permanently applied to said face.

3. A composition chock block molded from plastic material and having a curved bearing face, and a covering of finely divided material pressed into said face.

In testimony whereof I affix my signature.

EDWARD S. EVANS.